United States Patent [19]

Coombs et al.

[11] 3,843,665

[45] Oct. 22, 1974

[54] PROCESS FOR PREPARING SUBSTITUTED INDENO, NAPHTHO AND CYCLOHEPTA PYRAZOLES

[75] Inventors: Robert V. Coombs, Chatham; William J. Houlihan, Mountain Lakes, both of N.J.

[73] Assignee: Sandoz-Wander, Inc., Hanover, N.J.

[22] Filed: Apr. 11, 1973

[21] Appl. No.: 350,141

[52] U.S. Cl....... 260/296 T, 260/240 R, 260/296 P, 260/310 R, 260/590, 424/263, 424/273
[51] Int. Cl.............................................. C07d 31/42
[58] Field of Search.......... 260/296 T, 310 R, 296 P

[56] References Cited
UNITED STATES PATENTS
3,624,102  5/1969  Brown et al.................... 260/310 R
3,790,576  2/1974  DeWald......................... 260/286 R

*Primary Examiner*—Alan L. Rotman
*Attorney, Agent, or Firm*—Gerald D. Sharkin; Robert S. Honor; Thomas O. McGovern

[57] ABSTRACT

Substituted indeno [1,2-c] pyrazoles, naphtho [1,2-c] pyrazoles and benzo [6,7] cyclohepta [1,2-c] pyrazoles e.g., 3-(2,3-dimethoxyphenyl)-4H-indeno[1,2-c] pyrazole and 4,5-dihydro-3-(4-pyridyl)-2H-naphtho[1,2-c] pyrazole, are useful as non-estrogenic and anti-fertility agents and antihypertensive gents and are prepared by treating substituted indanones, $\alpha$-tetralones and benzosuberones with alkylphenylsulfonyl hydrazine.

17 Claims, No Drawings

PROCESS FOR PREPARING SUBSTITUTED INDENO, NAPHTHO AND CYCLOHEPTA PYRAZOLES

This invention relates to the preparation of indeno [1,2-c] pyrazole, naphtho [1,2-c] pyrazole and benzo [6,7] cyclohepta [1,2-c] pyrazole. More particularly it relates to the preparation of 3-substituted phenyl and 3-heterocyclic derivatives of indeno [1,2-c]pyrazole, naphtho [1,2-c] pyrazole and benzo [6,7] cyclohepta [1,2-c] pyrazole and their use in pharmaceutical compositions.

The compounds prepared by this invention may be represented by the following formula:

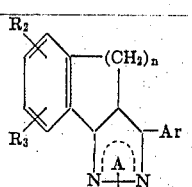

where
$n$ is 1, 2 or 3
Ar is

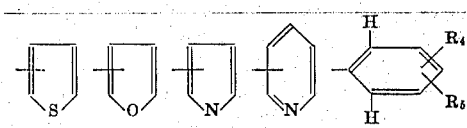

and
$R_2$, $R_3$, $R_4$ and $R_5$ each independently represent hydrogen, halo having an atomic weight of about 19 to 36, lower alkyl, i.e., alkyl having 1 to 4 carbon atoms, e.g., methyl, ethyl, isopropyl and the like; lower alkoxy, i.e., alkoxy having 1 to 4 carbon atoms, e.g., methoxy, ethoxy, isopropoxy and the like, or trifluoromethyl, or
$R_2$ and $R_3$ or $R_4$ and $R_5$ together independently represent methylenedioxy attached to adjacent carbon atoms provided that when $R_2$ and $R_3$ or $R_4$ and $R_5$ are independently trifluoromethyl or tertiary butyl, they are not on adjacent carbon atoms; and when $n$ is 1 and $R_2$ and $R_3$ are hydrogen, Ar is other than unsubstituted phenyl and pharmaceutically acceptable acid addition salts thereof.

The pyrazole ring (A) in the compounds of formula (I) can have the following structures:

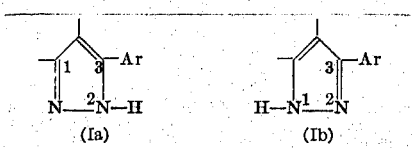

where Ar is as defined above. It should be noted that the compounds of structures (Ia) and (Ib) are considered equivalent and are known to exist in both tautomeric forms.

The compounds of formula (I) can be prepared by the following reaction sheme:

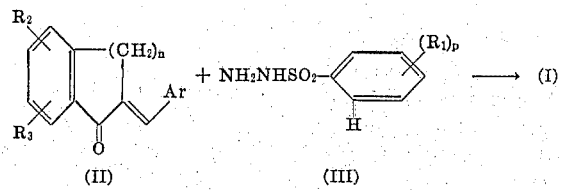

where
$p$ is 0, 1 or 2;
$R_1$ is lower alkyl having 1 to 3 carbon atoms, e.g., methyl, ethyl and the like and
$n$, $R_2$, $R_3$, Ar and the proviso are as set out above.

The compounds of formula (I) are prepared by treating a compound of formula (II) with a compound of formula (III) in an inert solvent at a temperature of 50°C or higher, preferably 75° to 100°C in the presence of an acid catalyst. The inert solvent is preferably a lower alcohol having 1 to 4 carbon atoms, e.g., methanol, ethanol and the like. The acid can be a mineral acid such as hydrochloric acid, phosphoric acid, sulfuric acid and the like or an organic acid such as acetic acid, p-toluenesulfonic acid and the like. It is also preferred that the reaction be run for from about 5 hours to 30 hours. The particular solvent, acid, temperature or time employed in the reaction is not critical. The product (I) is recovered by conventional techniques, e.g., crystallization.

The compounds of formula (II) are prepared by well known procedures by treating compounds of the formula

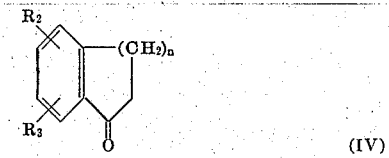

where $n$, $R_2$, $R_3$ and the proviso are as set out above with a compound of the formula

where Ar is as defined above.

The process is suitably carried out by standard techniques, preferably in an inert solvent such as ethanol or piperidine using a catalytic amount of a base such as sodium hydroxide, potassium hydroxide, diethylamine or triethylamine or in the presence of a catalytic amount of an acid such as hydrochloric acid, sulfuric acid, phosphoric acid, acetic acid, toluenesulfonic acid or methylsulfonic acid. The temperature of the reaction is 15° to 100° C usually 25° to 80°C, and the reaction is run for from 2 to 24 hours, normally 6 to 20 hours. The particular solvent, temperature or time used in the reaction is not critical.

Many of the compounds of formula (III), (IV) and (V) are known and are prepared by procedures disclosed in the literature. The compounds of formula (III), (IV) and (V) not specifically disclosed in the literature may be prepared by analogous methods using known starting materials.

The compounds of formula (I) are useful because they possess pharmacological activity in animals. In particular, the compounds are useful as hypotensive/anti-hypertensive agents, as indicated by their activity in renal hypertensive rats given 10 to 100 mg/kg of active compound using the techniques of A. Gollman (Proc, Soc. Exptl, Biol, and Med. 57:102, 1944) and indirectly measuring the blood pressure from the caudal artery in the tail using a pneumatic pulse transducer.

The compounds of formula (I), including the compound of formula (I) in which n is 1, $R_2$ and $R_3$ are hydrogen and Ar is unsubstituted phenyl, in particular, the compounds of formula (I) in which n is 2, Ar is pyridyl or substituted phenyl, e.g., 4,5-dihydro-3-(4-pyridyl)-2H-naphtho[1,2-c]pyrazole, are also useful as anti-fertility agents as indicated by their activity in female Wistar rats which are injected daily with 2 mg of the compound for eight successive days starting on the day of vaginal cornification. At the time of the fourth injection, males of known fertility are cohabitated with the females (one female with one male) until the end of the treatment period. The males are separated from the females 24 hours following the last injection. The females are sacrificed six days later, and examined for the presence of absence of implantation sites.

The use of the compounds as anti-fertility agents is further indicated by their luteolytic properties which results in the compounds being abortifacient agents. The luteolytic activity is determined using pseudopregnant rabbits treated with corn oil or 1 to 100 mg. per day of a compound of formula (I) suspended in corn oil on days 3 through 8 of pseudopregnancy. Blood samples are obtained daily throughout the length of pseudopregnancy. Plasma samples are analyzed for progestin content according to the method of Johansson, et al, (Endocrinology 82, 143, 1968). The compound is judged active if plasma progestin levels are similar to pretreatment values on day 12 of pseudopregnancy.

Abortifacient activity is also determined in female proestrous rats ((Royal Hart, Wistar strain) selected from a colony and caged with fertile males. On the following day pregnancy is confirmed by the presence of spermatozoa in the viginal smear. On the seventh day following mating the females are treated with 1 to 30 milligrams of the compound to be tested. The animals are injected daily for a total of seven days; and on the eighth day following the first injection the animals are killed and the uterus checked for the presence or absence of implantation sites.

The compounds of formula (I), when used as anti-fertility agents exhibit none of the estrogenic effects and side effects exhibited by the steroidal type compounds used for these purposes.

When the compounds are employed for the above utilities, they may be combined with one or more pharmaceutically acceptable carriers or adjuvants, and may be administered orally in such forms as tablets, capsules, elixirs, suspensions and the like, e.g., bucally or sub-liqually as a tablet, parenterally in the form of an injectable solution or suspension or in special forms such as suppositories, e.g., vaginal inserts, pessaries, and the like. Depending upon the compound employed and the mode of administration the exact dosage utilized may vary.

Furthermore, the compounds of formula (I) may be similarly administered in the form of their non-toxic pharmaceutically acceptable acid addition salts. Such salts possess the same order of activity as the free base, are readily prepared by reacting the base with an appropriate acid and accordingly, are included within the scope of the invention. Representative of the acid addition salts are the mineral acid salts, such as the hydrochloride, hydrobromide, sulfate, phosphate and the like and the organic acid salts, such as the malate succinate, benzoate, acetate, methanesulfonate, gluconate, p-toluenesulfonate, benzenesulfonate, naphthalenesulfonate, and the like.

In general, satisfactory results are obtained when these compounds are administered as a hypotensive/anti-hypertensive agent at a daily dosage of about 2 milligrams to about 200 milligrams per kilogram of animal body weight. This daily dosage is preferably administered 2 to 4 times a day, or in sustained release form. For most large mammals, such as primates, the total daily dosage is from about 150 milligrams to about 2,000 milligrams. Dosage forms suitable for internal use comprise from about 37.5 milligrams to about 1,000 milligrams of the active compound in intimate admixture with a solid or liquid pharmaceutically acceptable carrier or diluent.

When the compounds of formula (I) are administered as an antifertility agent, satisfactory results are obtained at a daily dosage of about 1.0 milligrams to about 200 milligrams orally, subcutaneously or intramuscularly per kilogram of animal body weight. This daily dosage is preferably administered 1 to 4 times a day or in sustained release form. For most large mammals, such as primates, the total daily dosage is from about 1 milligram to about 600 milligrams. Dosage forms suitable for internal use comprise from about 0.25 milligrams to about 300 milligrams of the active compound in intimate admixture with a solid or liquid pharmaceutically acceptable carrier or diluent.

A representative formulation suitable for intramuscular administration once a day in fertility control is an injectable suspension prepared by standard techniques which contain the following:

| Ingredients | Weight (mg) |
| --- | --- |
| 4,5-dihydro-3-(4-pyridyl)-2H-naphtho[1,2-c]pyrazole | 200 |
| sodium carboxy methyl cellulose U.S.P. | 1.25 |
| methyl cellulose | 0.4 |
| polyvinylpyrrolidone | 5 |
| lecithin | 3 |
| benzyl alcohol | 0.01 |
| buffer agent to adjust pH for desired stability | q.s. |
| water | for injection q.s. to 2 ml |

EXAMPLE 1

4,5-dihydro-3-(4-pyridyl)-2H-naphtho[1,2-c]pyrazole
Step A: 2-(4-pyridylmethylene)-1-tetralone A mixture of 73.0 grams (0.50 moles) of α-tetralone, 64.2 grams (0.60 moles) of 4-pyridinecarboxaldehyde 10 grams of piperidine and 10 grams of acetic acid are heated at 80°C for 19 hours. The resultant solid is crystallized from about 400 ml. of ethanol to give 2-(4-pyridylmethylene)-1-tetralone; (m.p. 112°–114°C).

Following the above procedure but using an equivalent amount of
a. 2-pyridinecarboxaldehyde
b. 3-pyridinecarboxaldehyde
c. p-chlorobenzaldehyde
d. p-methoxybenzaldehyde
e. 2-thiophenecarboxaldehyde
f. 2-furfural
g. 2-pyrrolealdehyde
h. p-tolualdehyde
i. benzaldehyde
j. m-tolualdehyde or
k. o-tolualdehyde
in place of the 4-pyridinecarboxaldehyde used therein, there is obtained
a. 2-(2-pyridylmethylene)-1-tetralone
b. 2-(3-pyridylmethylene)-1-tetralone
c. 2-(p-chlorobenzylidine)-1-tetralone
d. 2-(p-methoxybenzylidine)-1-tetralone
e. 2-(2-thienylmethylene)-1-tetralone
f. 2-(2-furylmethylene)-1-tetralone
g. 2-(2-pyrrolylmethylene)-1-tetralone
h. 2-(p-methylbenzylidine)-1-tetralone
i. 2-benzylidine-1-tetralone
j. 2-(m-methylbenzylidine)-1-tetralone or
k. 2-(o-methylbenzylidine)-1-tetralone, respectively.

When the process of this example is carried out using an equivalent amount of
l. 7-chloro-α-tetralone
m. 7-methyl-α-tetralone
n. 7,8-dimethoxy-α-tetralone
o. 7-trifluoromethyl-α-tetralone
p. 7,8-methylenedioxy-α-tetralone
q. 7-methoxy-α-tetralone
r. benzosuberone or
s. 8-methoxy-1-benzosuberone
in place of the α-tetralone, there is obtained
l. 7-chloro-2-(4-pyridylmethylene)-1-tetralone
m. 7-methyl-2-(4-pyridylmethylene)-1-tetralone
n. 7,8-dimethoxy-2-(4-pyridylmethylene)-1-tetralone
o. 7-trifluoromethyl-2-(4-pyridylmethylene)-1-tetralone
p. 7,8-methylenedioxy-2-(4-pyridylmethylene)-1-tetralone
q. 7-methoxy-2-(4-pyridylmethylene)-1-tetralone
r. 2-(4-pyridylmethylene)-1-benzosuberone or
s. 8-methoxy-2-(4-pyridylmethylene)-1-benzosuberone respectively.

When the above process is carried out using an equivalent amount of indanone in place of the α-tetralone there is obtained
t. 2-(4-pyridylmethylene)-1-indanone.

Following the above process using an equivalent amount of indanone in place of the α-tetralone and in place of the 4-pyridinecarboxaldehyde an equivalent amount of
u. p-tolualdehyde
v. 3,4-dichlorobenzaldehyde
w. 3,4-dimethoxybenzaldehyde
x. 3-trifluoromethylbenzaldehyde
y. 3,4-methylenedioxybenzaldehyde
z. 2-thiophenecarboxaldehyde
aa. 2-furfural
ab. 2-pyrrolealdehyde
ac. 3-pyridinecarboxaldehyde
ad. 2-pyridinecarboxaldehyde or
ae. p-chlorobenzaldehyde
there is obtained
u. 2-(p-methylbenzylidine)-1-indanone
v. 2-(3,4-dichlorobenzylidinel)-1-indanone
w. 2-(3,4-dimethoxybenzylidine)-1-indanone
x. 2-(3-trifluoromethylbenzylidine)-1-indanone
y. 2-(3,4-methylenedioxybenzylidine)-1-indanone
z. 2-(2-thienylmethylene)-1-indanone
aa. 2-(2-furylmethylene)-1-indanone
ab. 2-(2-pyrrolylmethylene)-1-indanone
ac. 2-(3-pyridinemethylene)-1-indanone
ad. 2-(2-pyridinemethylene)-1-indanone or
ae. 2-(p-chlorobenzylidine)-1-indanone respectively.

When the process of this example is carried out using an equivalent amount of p-chlorobenzaldehyde in place of the 4-pyridinecarboxaldehyde and in place of the α-tetralone, an equivalent amount of
af. 5-chloro-1-indanone
ag. 5-methyl-1-indanone
ah. 5,6-dimethoxy-1-indanone
ai. 5-trifluoromethyl-1-indanone or
aj. 5,6-methylenedioxy-1-indanone
there is obtained
af. 5-chloro-2-(p-chlorobenzylidine)-1-indanone
ag. 5-methyl-2-(p-chlorobenzylidine)-1-indanone
ah. 5,6-dimethoxy-2-(p-chlorobenzylidine)-1-indanone
ai. 5-trifluoromethyl-2-(p-chlorobenzylidine)-1-indanone or
aj. 5,6-methylenedioxy-2-(p-chlorobenzylidine)-1-indanone respectively.

Step B: 4,5-dihydro-3-(4-pyridyl)-2H-naphtho[1,2-c]pyrazole

A solution of 2.0 grams of 2-(4-pyridinemethylene)-1-tetralone, 1.89 grams of p-toluenesulfonylhydrazine, 0.38 grams of p-toluenesulfonic acid and 30.0 ml. of n-butyl alcohol is stirred and refluxed for about 20 hours. The solvent is removed in vacuo, and the residue is dissolved in 150 ml. of chloroform, washed with 25 ml of 2N sodium hydroxide, dried with magnesium sulfate and then filtered. The filtrate is passed through silica gel and the eluant is concentrated in vacuo. The residue is crystallized from ether to give 4,5-dihydro-3-(4-pyridyl)-2H-naphtho[1,2-c]pyrazole, m.p. 229°C.

When the above process is carried out using in place of the 2-(4-pyridinemethylene)-1-tetralone, an equivalent amount of
a. 2-(2-pyridylmethylene)-1-tetralone
b. 2-(3-pyridylmethylene)-1-tetralone
c. 2-(p-chlorobenzylidine)-1-tetralone
d. 2-(p-methoxybenzylidine)-1-tetralone
e. 2-(2-thienylmethylene)-1-tetralone
f. 2-(2-furylmethylene)-1-tetralone
g. 2-(2-pyrrolylmethylene)-1-tetralone
h. 2-(p-methylbenzylidine)-1-tetralone
i. 2-(benzylidine)-1-tetralone
j. 2-(m-methylbenzylidine)-1-tetralone
k. 2-(o-methylbenzylidine)-1-tetralone
l. 7-chloro-2-(4-pyridylmethylene)-1-tetralone
m. 7-methyl-2-(pyridylmethylene)-1-tetralone
n. 7,8-dimethoxy-2-(4-pyridylmethylene)-1-tetralone
o. 7-trifluoromethyl-2-(4-pyridylmethylene)-1-tetralone
p. 7,8-methylenedioxy-2-(4-pyridylmethylene)-1-tetralone
q. 7-methoxy-2-(4-pyridylmethylene)-1-tetralone
r. 2-(4-pyridylmethylene)-1-benzosuberone s. 8-methoxy-2-(4-pyridylmethylene)-1-benzosuberone
t. 2-(4-pyridylmethylene)1-indanone
u. 2-(p-methylbenzylidine)-1-indanone
v. 2-(3,4-dichlorobenzylidine)-1-indanone
w. 2-(3,4-dimethoxybenzylidine)-1-indanone
x. 2-(3-trifluoromethylbenzylidine)-1-indanone
y. 2-(3,4-methylenedioxybenzylidine)-1-indanone
z. 2-(2-thienylmethylene)-1-indanone
aa. 2-(2-furylmethylene)-1-indanone
ab. 2-(2-pyrrolylmethylene)-1-indanone
ac. 2-(3-pyridinemethylene)-1-indanone
ad. 2-(2-pyridinemethylene)-1-indanone
ae. 2-(p-chlorobenzylidine)-1-indanone
af. 5-chloro-2-(p-chlorobenzylidine)-1-indanone
ag. 5-methyl-2-(p-chlorobenzylidine)-1-indanone
ah. 5,6-dimethoxy-2-(p-chlorobenzylidine)-1-indanone
ai. 5-trifluoromethyl-2-(p-chlorobenzylidine)-1-indanone or
aj. 5,6-methylenedioxy-2-(p-chlorobenzylidine)-1-indanone
there is obtained
a. 4,5-dihydro-3-(2-pyridyl)-2H-naphtho[1,2-c] pyrazole, m.p. 182°–184°;
b 4,5-dihydro-3-(3-pyridyl)-2H-naphtho[1,2-c] pyrazole, m.p. 226°–228°;
c. 4,5-dihydro-3-(p-chlorophenyl)-2H-naphtho[1,2-c]pyrazole, m.p. 194°–195°;
d. 4,5-dihydro-3-(p-methoxyphenyl)-2H-naphtho[1,2-c]pyrazole, m.p. 161°–163°;
e. 4,5-dihydro-3-(2-thienyl)-2H-naphtho[1,2-c]pyrazole, m.p. 211°–213°;
f. 4,5-dihydro-3-(2-furyl)-2H-naphtho[1,2-c]pyrazole, m.p. 160°–161°;
g. 4,5-dihydro-3-(2-pyrrolyl)-2H-naphtho[1,2-c]pyrazole, m.p. 229°–230°;
h. 4,5-dihydro-3-(p-tolyl)-2H-naphtho[1,2-c]pyrazole, m.p. 184°–186°;
i. 4,5-dihydro-3-phenyl-2H-naphtho[1,2-c]pyrazole, m.p. 173°–174°;
j. 4,5-dihydro-3-(m-tolyl)-2H-naphtho[1,2-c]pyrazole, m.p. 161°–163°;
k. 4,5-dihydro-3-(o-tolyl)-2H-naphtho[1,2-c]pyrazole, m.p. 186°–187°;
l. 7-chloro-4,5-dihydro-3-(4-pyridyl)-2H-naphtho[1,2-c]pyrazole, m.p. 250°–252°;
m. 7-methyl-4,5-dihydro-3-(4-pyridyl)-2H-naphtho[1,2-c]pyrazole, m.p. 222°–224°;
n. 7,8-dimethoxy-4,5-dihydro-3-(4-pyridyl)-2H-naphtho[1,2-c]pyrazole, m.p. 245°;
o. 7-trifluoromethyl-4,5-dihydro-3-(4-pyridyl)-2H-naphtho[1,2-c]pyrazole;
p. 7,8-methylenedioxy-4,5-dihydro-3-(4-pyridyl)-2H-naphtho[1,2-c]pyrazole, m.p. 198°–200°;
q. 4,5-dihydro-7-methoxy-3-(4-pyridyl)-2H-naphtho[1,2-c]pyrazole, m.p. 169°–170°;
r. 3-(4-pyridyl)-3,4,5,6-tetrahydro-2H-benzo[6,7]cyclohepta[1,2-c]pyrazole m.p. 217°–219°;
s. 9-methoxy-3-(4-pyridyl)-3,4,5,6-tetrahydro-2H-benzo[6,7]cyclohepta[1,2-c]pyrazole, m.p. 200°–201°;
t. 3-(4-pyridyl)-2H-indeno[1,2-c]pyrazole, m.p. 270°–272°;
u. 3-(p-tolyl)-4H-indeno[1,2-c]pyrazole, m.p. 250°–252°;
v. 3-(3,4-dichlorophenyl)-4H-indeno[1,2-c]pyrazole, m.p. 252°;
w. 3-(3,4-dimethoxyphenyl)-4H-indeno[1,2-c]pyrazole, m.p. 231°;
x. 3-(3-trifluoromethylphenyl)-4H-indeno[1,2-c]pyrazole, m.p. 260°–262°;
y. 3-(3,4-methylenedioxyphenyl)-4H-indeno[1,2-c] pyrazole, m.p. 285°–287°;
z. 3-(2-thienyl)-4H-indeno[1,2-c]pyrazole, m.p. 220°–221°;
aa. 3-(2-furyl)-4H-indeno[1,2-c]pyrazole, m.p. 186°–188°;
ab. 3-(2-pyrrolyl)-4H-indeno[1,2-c]pyrazole, m.p. 215°–218°C;
ac. 3-(3-pyridyl)-4H-indeno[1,2-c]pyrazole m.p. 229°–231°;
ad. 3-(2-pyridyl)-4H-indeno[1,2-c]pyrazole, m.p. 216°–218°;
ae. 3-(p-chlorophenyl)-4H-indeno[1,2-c]pyrazole, m.p. 266°–268°;
af. 6-chloro-3-(p-chlorophenyl)-4H-indeno[1,2-c]pyrazole, m.p. 280°;
ag. 6-methyl-3-(p-chlorophenyyl)-4H-indeno[1,2-c]pyrazole, m.p. 294°–295°;
ah. 6,7-dimethoxy-3-(p-chlorophenyl)-4H-indeno[1,2-c]pyrazole, m.p. 235°;
ai. 6-trifluoromethyl-3-(p-chlorophenyl)-4H-indeno[1,2-c]pyrazole;
aj. 6,7-methylenedioxy-3-(p-chlorophenyl)-4H-indeno[1,2-c]pyrazole m.p. 278° where all melting point temperatures are in degrees centigrade.

What is claimed is:
1. A process for preparing a compound of the formula

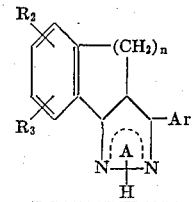

where ring A represents the structures

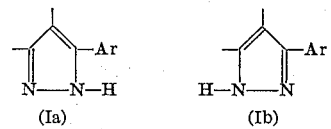

$n$ is 1, 2, or 3;
Ar is

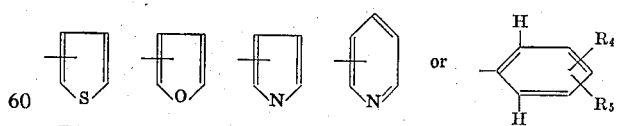

and
$R_2$, $R_3$, $R_4$, and $R_5$ each independently represent hydrogen, halo having an atomic weight of about 19 to 36, lower alkyl having 1 to 4 carbon atoms, lower alkoxy, trifluoromethyl or R₂ and R₃ or R₄ and R₅ together independently represent methylenedioxy attached to adjacent carbon atoms, provided that when R₂ and R₃ or R₄ and R₅ are independently trifluoromethyl or tertiary butyl they are not on adjacent carbon atoms, and when $n$ is 1 and R₂ and R₃ are hydrogen, Ar is other than unsubstituted phenyl, which comprises reacting a compound of the formula

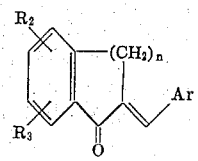

with a compound of the formula

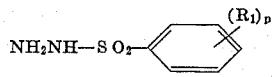

where
p is 0, 1 or 2
R₁ is lower alkyl having 1 to 3 carbon atoms and
$n$, R₂, R₃, Ar and the proviso are as defined above in an inert solvent at a temperature of 50°C. to 100°C. in the presence of an acid catalyst, selected from mineral acids, acetic acid or p-toluenesulfonic acid.

2. The process according to claim 1 in which the inert solvent is lower alkanol having 1 to 4 carbon atoms.
3. The process of claim 1, in which $n$ is 2.
4. the process of claim 1 in which $n$ is 3.
5. The process of claim 1 in which Ar is pyridyl.
6. The process of claim 5 in which $n$ is 2.
7. The process of claim 5 in which $n$ is 3.
8. The process of claim 1 in which Ar is

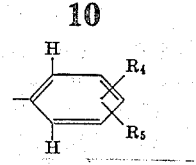

where R₄, R₅ and the proviso are defined in claim 1.

9. The compound of claim 8 in which $n$ is 2.
10. The process according to claim 1 in which the product is 4,5-dihydro-3-(4-pyridyl)-2H-naphtho[1,2-c]pyrazole.
11. The process according to claim 1 in which the product is 3-(2,3-dimethoxyphenyl)-4H-indeno[1,2-c]pyrazole.
12. The process according to claim 1 in which the product is 4,5-dihydro-3-(2-pyridyl)-2H-naphtho[1,2-c]pyrazole.
13. The process according to claim 1 in which the product is 4,5-dihydro-3-(3-pyridyl)-2H-naphtho[1,2-c]pyrazole.
14. The process according to claim 1 in which the product is 4,5-dihydro-3-(p-chlorophenyl)-2H-naphtho[1,2-c]pyrazole.
15. The process according to claim 1 in which the product is 4,5-dihydro-3-(p-methoxyphenyl)-2H-naphtho[1,2-c]pyrazole.
16. The process according to claim 1 in which the product is (4-pyridyl)-2h-benzo[6,7]cyclohepta[1,2-c]-pyrazole.
17. The process according to claim 1 in which the product is 4,5-dihydro-3-phenyl-2H-naphtho[1,2-c]pyrazole.

* * * * *